United States Patent
Cai et al.

(10) Patent No.: US 10,399,011 B2
(45) Date of Patent: Sep. 3, 2019

(54) INTEGRATED COMPOSITE FILTER CARTRIDGE AND WATER PURIFYING SYSTEM HAVING SAME

(71) Applicants: FOSHAN SHUNDE MIDEA WATER DISPENSER MFG. CO., LTD., Foshan (CN); MIDEA GROUP CO., LTD., Foshan (CN)

(72) Inventors: Xuegang Cai, Foshan (CN); Lei Liu, Foshan (CN)

(73) Assignees: FOSHAN SHUNDE MIDEA WATER DISPENSER MFG. CO., LTD., Foshan (CN); MIDEA GROUP CO., LTD., Foshan (CN)

(*) Notice: Subject to any disclaimer, the term of this patent is extended or adjusted under 35 U.S.C. 154(b) by 0 days.

(21) Appl. No.: 15/550,015

(22) PCT Filed: Apr. 30, 2015

(86) PCT No.: PCT/CN2015/078089
§ 371 (c)(1),
(2) Date: Aug. 9, 2017

(87) PCT Pub. No.: WO2016/127505
PCT Pub. Date: Aug. 18, 2016

(65) Prior Publication Data
US 2018/0043288 A1    Feb. 15, 2018

(30) Foreign Application Priority Data

Feb. 9, 2015 (CN) .......................... 2015 1 0068132

(51) Int. Cl.
*B01D 27/14* (2006.01)
*B01D 27/08* (2006.01)
(Continued)

(52) U.S. Cl.
CPC ........... *B01D 27/148* (2013.01); *B01D 15/00* (2013.01); *B01D 27/08* (2013.01); *B01D 39/04* (2013.01);
(Continued)

(58) Field of Classification Search
CPC .... B01D 27/148; B01D 63/06; B01D 63/065; B01D 63/10; B01D 69/10; B01D 27/08;
(Continued)

(56) References Cited

U.S. PATENT DOCUMENTS 5,078,876 A * 1/1992 Whittier ................ B01D 61/08
                                                                  210/294
2003/0164333 A1  9/2003 Nohren et al.
2004/0104161 A1  6/2004 Gaignet et al.

FOREIGN PATENT DOCUMENTS

CN    100528306 C    8/2009
CN    202193666 U    4/2012
(Continued)

OTHER PUBLICATIONS

EP Office Action dated Jul. 26, 2018 in the corresponding EP application (application No. 15881666.0).
(Continued)

*Primary Examiner* — Madeline Gonzalez
(74) *Attorney, Agent, or Firm* — Kilpatrick Townsend & Stockton, LLP

(57) ABSTRACT

Disclosed are an integrated composite filter cartridge (200) and a water purifying system (300) having same. The integrated composite filter cartridge (200) comprises: an outer shell (20), wherein a chamber (21) is defined in the outer shell (20), and the outer shell (20) is provided with a raw water inlet (22), a pre-treated water outlet (23), a pre-treated water inlet (24), a purified water outlet (25) and a waste water outlet (26) which are in communication with
(Continued)

the chamber (21); a pre-treatment filter cartridge (100); a central pipe (30); a filter membrane (40); and a control member, which is connected to the pre-treated water outlet (23) and the pre-treated water inlet (24). When the integrated composite filter cartridge (200) is used for the first time, the control member switches on the raw water inlet (22) and the pre-treated water outlet (23) and switches off the pre-treated water inlet (24).

13 Claims, 9 Drawing Sheets

(51) Int. Cl.
　　　B01D 39/04　　　(2006.01)
　　　B01D 61/14　　　(2006.01)
　　　B01D 15/00　　　(2006.01)
　　　C02F 1/44　　　　(2006.01)
　　　C02F 1/28　　　　(2006.01)
　　　C02F 1/00　　　　(2006.01)
　　　B01D 63/06　　　(2006.01)
　　　B01D 63/10　　　(2006.01)
　　　B01D 69/10　　　(2006.01)
　　　B01D 61/02　　　(2006.01)
　　　B01D 61/08　　　(2006.01)
　　　B01D 61/18　　　(2006.01)
(52) U.S. Cl.
　　　CPC ......... *B01D 61/145* (2013.01); *B01D 61/147* (2013.01); *B01D 63/06* (2013.01); *B01D 63/065* (2013.01); *B01D 63/10* (2013.01); *B01D 69/10* (2013.01); *C02F 1/001* (2013.01); *C02F 1/283* (2013.01); *C02F 1/444* (2013.01); *B01D 61/02* (2013.01); *B01D 61/08* (2013.01); *B01D 61/18* (2013.01); *B01D 2201/291* (2013.01); *B01D 2239/065* (2013.01); *B01D 2311/04* (2013.01); *B01D 2313/44* (2013.01); *B01D 2313/50* (2013.01); *B01D 2321/40* (2013.01); *C02F 2201/005* (2013.01); *C02F 2201/006* (2013.01); *C02F 2209/40* (2013.01)
(58) Field of Classification Search
　　　CPC .... B01D 61/147; B01D 15/00; B01D 61/145; B01D 39/04; B01D 61/18; B01D 61/02; B01D 2313/50; B01D 2321/40; B01D 2311/04; B01D 61/08; B01D 2239/065; B01D 2313/44; B01D 2201/291; C02F 1/283; C02F 1/444; C02F 1/001; C02F 2201/006; C02F 2201/005; C02F 2209/40
　　　USPC ....... 210/283, 315, 314, 316, 337, 338, 335, 210/321.78, 321.87, 437
　　　See application file for complete search history.

(56) References Cited

FOREIGN PATENT DOCUMENTS

| | | | |
|---|---|---|---|
| CN | 202336295 | U | 7/2012 |
| CN | 103755051 | A | 4/2014 |
| CN | 203513385 | U | 4/2014 |
| CN | 203904091 | U | 10/2014 |
| DE | 3805361 | A1 | 9/1988 |
| EP | 3034470 | A1 | 6/2016 |
| JP | 2007136384 | A | 6/2007 |
| WO | 03089104 | A3 | 12/2003 |

OTHER PUBLICATIONS

Indian Examination Report dated Mar. 15, 2019 in the corresponding Indian application (application No. 201737030938).

* cited by examiner

INTEGRATED COMPOSITE FILTER CARTRIDGE AND WATER PURIFYING SYSTEM HAVING SAME

CROSS-REFERENCE TO RELATED APPLICATION

This application is a national phase entry under 35 U.S.C § 371 of International Application PCT/CN2015/078089, filed Apr. 30, 2015, which claims priority to and benefits of Chinese Patent Applications Serial No. 201510068132.2 and 201520091323.6, both filed with the State Intellectual Property Office of P. R. China on Feb. 9, 2015, the entire contents of which are incorporated herein by reference.

FIELD

The present disclosure relates to a field of water purification technologies, more particularly to an integrated composite filter cartridge and a water purification system having the same.

BACKGROUND

A water purification device in the related art employs a PP (polypropylene) cotton, an activated carbon or the like as a pre filter cartridge, which is further connected with a RO (reverse osmosis) filter cartridge in series. A water system formed by connecting multi-stage filter cartridges together conducts a water purification treatment. The whole system has a complex pipeline arrangement, and is inconvenient to be mounted and replaced. Moreover, the system has many connectors, which may result in many water leakage risk points. The system needs to be flushed for thirty minutes by a professional installation person when the system is used for the first time or a filter cartridge thereof is replaced. More importantly, the multi-stage filter cartridges have different service lives. A consumer needs to replace 3 to 5 stages of filter cartridges. That is, the consumer needs to purchase the filter cartridges frequently, and also the professional installation person is required to replace the filter cartridge. Thus, the consumer has a poor experience and a comprehensive cost is high.

SUMMARY

Embodiments of the present disclosure seek to solve at least one of problems existing in the related art to at least some extent.

Thus, the present disclosure proposes an integrated composite filter cartridge, which has a simple structure, is capable of performing an automatic flushing when mounted for the first time, and is convenient to use.

The present disclosure further proposes a water purification system having the above integrated composite filter cartridge.

The integrated composite filter cartridge according to embodiments of a first aspect of the present disclosure includes a housing defining a chamber therein, and having a raw-water inlet, a pretreated-water outlet, a pretreated-water inlet, a pure-water outlet and a waste-water outlet each in communication with the chamber; and a pretreatment filter cartridge mounted in the chamber and extending in an axial direction of the chamber. The pretreatment filter cartridge includes: a mounting pipe configured to have a hollow cylinder shape extending in an up-and-down direction; a filter layer fitted over the mounting pipe, a water input passage in communication with the raw-water inlet being defined between the filter layer and the housing, and a pretreated-water output passage in communication with the pretreated-water outlet being defined between the filter layer and the mounting pipe; a central pipe mounted in the mounting pipe and extending in an axial direction of the mounting pipe, the central pipe being spaced apart from the mounting pipe to form a filter chamber in communication with the pretreated-water inlet, an end of the central pipe being in communication with the pure-water outlet, and the central pipe having a water input hole in a side wall thereof; a filter membrane disposed in the filter chamber and winded around an outer circumferential wall of the central pipe, a waste-water passage being defined between an outer circumferential wall of the filter membrane and an inner circumferential wall of the mounting pipe, and the waste-water passage being in communication with the waste-water outlet; a control member connected to the pretreated-water outlet and pretreated-water inlet, and configured to communicate the raw-water inlet and the pretreated-water outlet and to close the pretreated-water inlet when the integrated composite filter cartridge is used for the first time.

In the integrated composite filter cartridge according to embodiments of the present disclosure, the pretreatment filter cartridge is designed integrally, various filter layers have a consistent service life, and the whole pretreatment filter cartridge can be replaced at one time after expiration, thereby solving a problem that a consumer needs to replace different filter cartridges frequently, and hence reducing a cost. The integrated composite filter cartridge is provided with the control member, and the control member can automatically recognize that the integrated composite filter cartridge is mounted and used for the first time, so as to perform an automatic flushing without being flushed manually, so that the integrated composite filter cartridge can be used more conveniently.

Furthermore, the integrated composite filter cartridge according to embodiments of the present disclosure may further have following additional technical features.

According to an embodiment of the present disclosure, two filter layers are provided and winded around the mounting pipe respectively, the filter layer located at an outer circle is configured as a PP cotton, and the filter layer located at an inner circle is configured as a carbon rod.

According to an embodiment of the present disclosure, the filter layer includes a first filter layer, a second filter layer and a third filter layer fitted over the mounting pipe successively from outside to inside, the first filter layer is configured as a PP cotton, the second filter layer is configured as an activated carbon fiber winding layer, the third filter layer is configured as one of the PP cotton, a microfiltration membrane or an ultrafiltration membrane, the water input passage in communication with the raw-water inlet is defined between the first filter layer and the housing, and the pretreated-water output passage in communication with the pretreated-water outlet is defined between the third filter layer and the mounting pipe.

According to an embodiment of the present disclosure, the pretreatment filter cartridge further includes: an upper-end cap disposed to a periphery of an upper end of the mounting pipe; a lower-end cap disposed to a periphery of a lower end of the mounting pipe, and the filter layer being disposed between the upper-end cap and the lower-end cap; a support pipe fitted over the mounting pipe and located between the upper-end cap and the lower-end cap, the filter layer being disposed between an outer circumferential surface of the mounting pipe and an inner circumferential surface of the support pipe, and the support pipe having a plurality of through holes communicating inside with outside.

According to an embodiment of the present disclosure, the pretreatment filter cartridge further includes an inner pipe fitted over the mounting pipe, an inner circumferential surface of the inner pipe is spaced apart from the outer circumferential surface of the mounting pipe, an upper end of the inner pipe abuts against the upper-end cap, a lower end of the inner pipe abuts against the lower-end cap, the filter layer is fitted over the inner pipe, and the inner pipe has a plurality of water-passing holes communicating inside with outside.

According to an embodiment of the present disclosure, the raw-water inlet is configured as a single hole, the pretreated-water outlet and the pretreated-water inlet are configured to be in a nested arrangement, the pretreated-water inlet is nested within the pretreated-water outlet, the pure-water outlet and the waste-water outlet are configured to be in a nested arrangement, and the pure-water outlet is nested within the waste-water outlet.

According to an embodiment of the present disclosure, the filter membrane is configured as a reverse osmosis membrane, an ultrafiltration membrane or a nanofiltration membrane.

The water purification system according to embodiments of a second aspect of the present disclosure includes: an integrated composite filter cartridge according to the above embodiments; a tap-water inlet in communication with the raw-water inlet; a membrane pump disposed between the pretreated-water outlet and the pretreated-water inlet; a pure-purified-water outlet in communication with the pure-water outlet; and a concentrated-flushing-water outlet in communication with the waste-water outlet.

According to an embodiment of the present disclosure, the control member includes: a first control valve disposed between the pretreated-water outlet and the pretreated-water inlet and configured to switch on or off communication between the pretreated-water outlet and the pretreated-water inlet; and a second control valve disposed between the pretreated-water outlet and the concentrated-flushing-water outlet and configured to switch on or off communication between the pretreated-water outlet and the concentrated-flushing-water outlet.

According to an embodiment of the present disclosure, a flexible water bag is provided between the pure-purified-water outlet and the pure-water outlet.

Additional aspects and advantages of embodiments of present disclosure will be given in part in the following descriptions, become apparent in part from the following descriptions, or be learned from the practice of the embodiments of the present disclosure.

Figure 1:
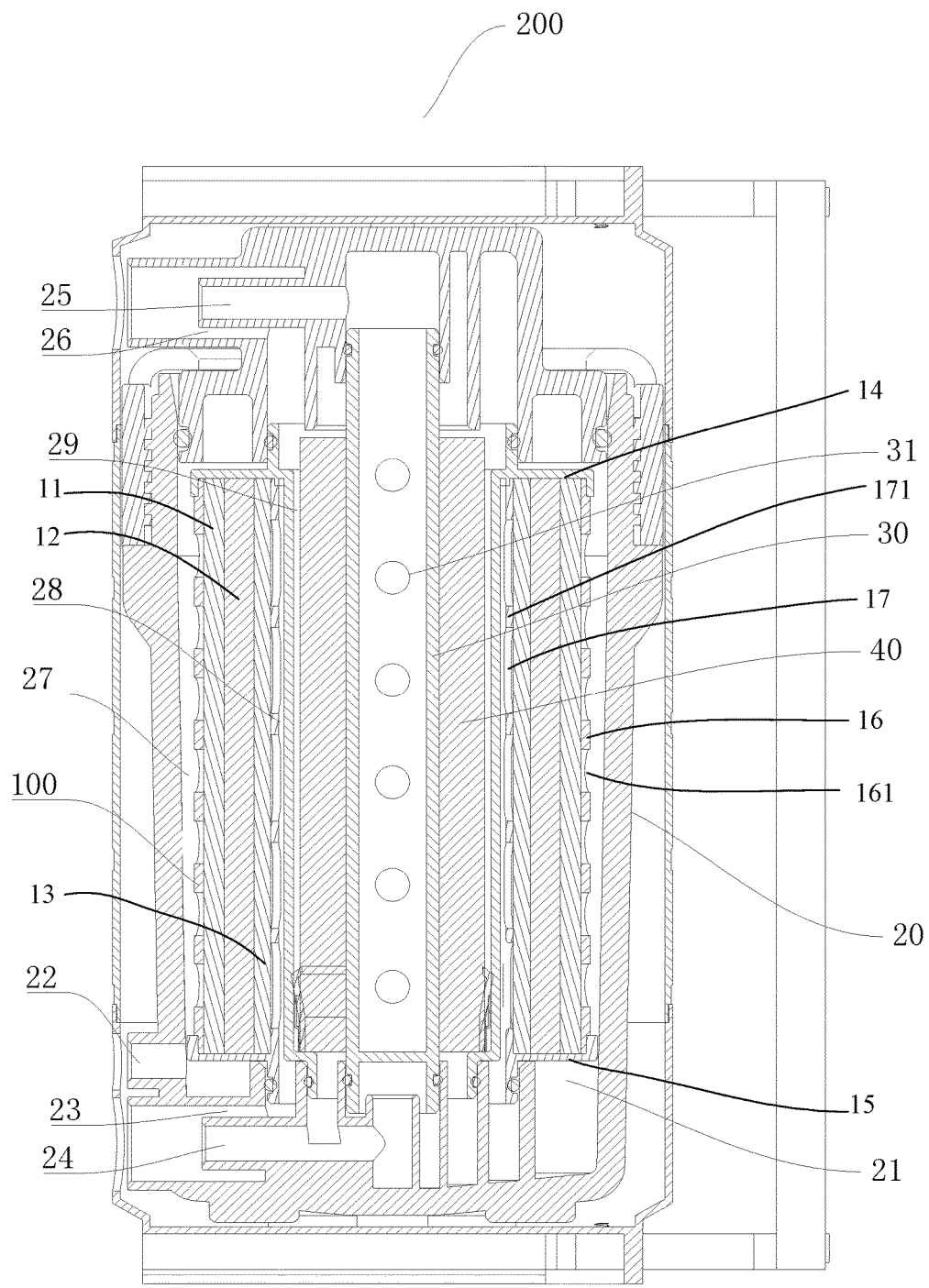
FIG. 1 illustrates a sectional view of an integrated composite filter cartridge according to an embodiment of the present disclosure.
Figure 2:
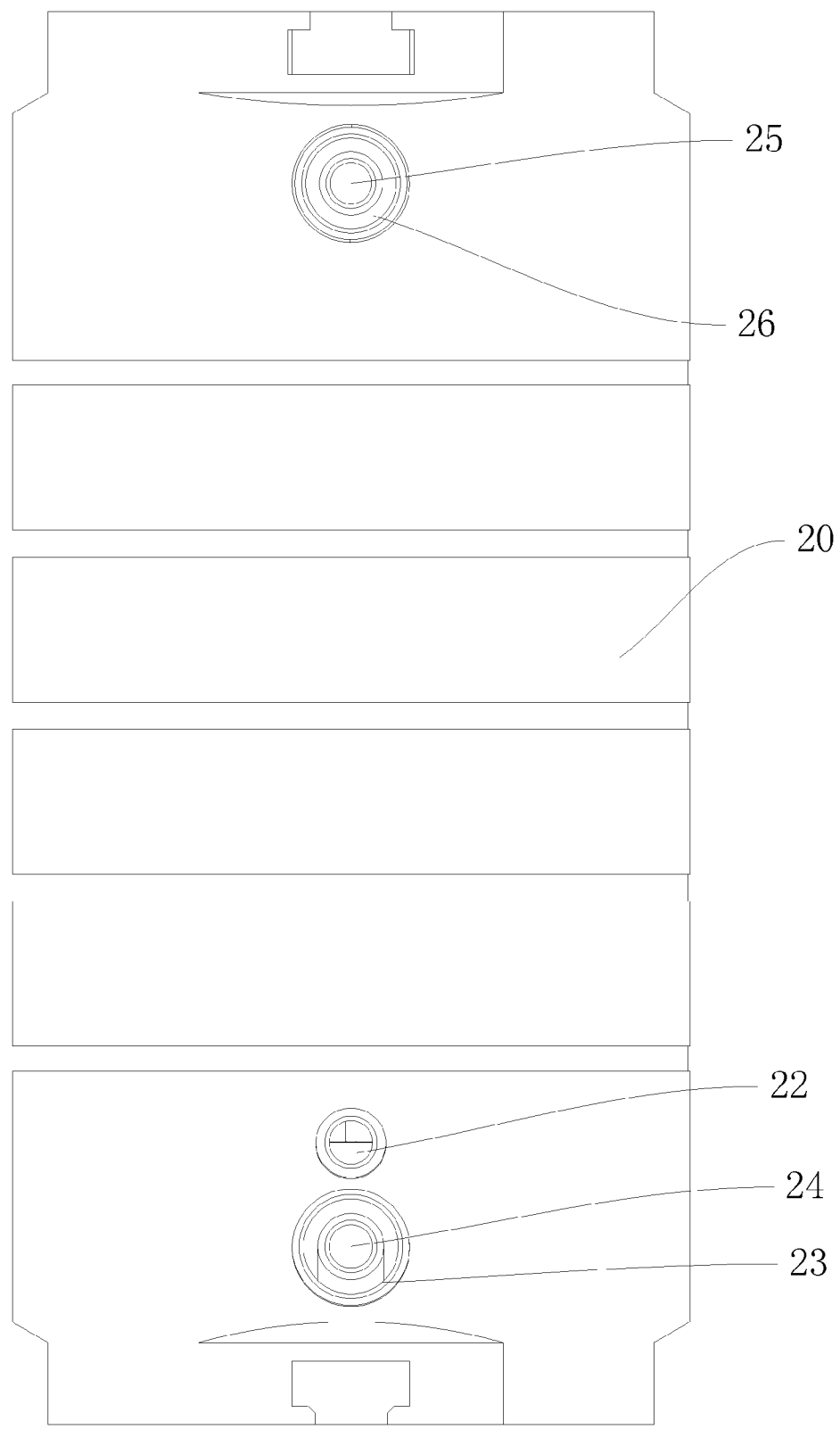
FIG. 2 illustrates a front view of an integrated composite filter cartridge according to an embodiment of the present disclosure.
Figure 3:
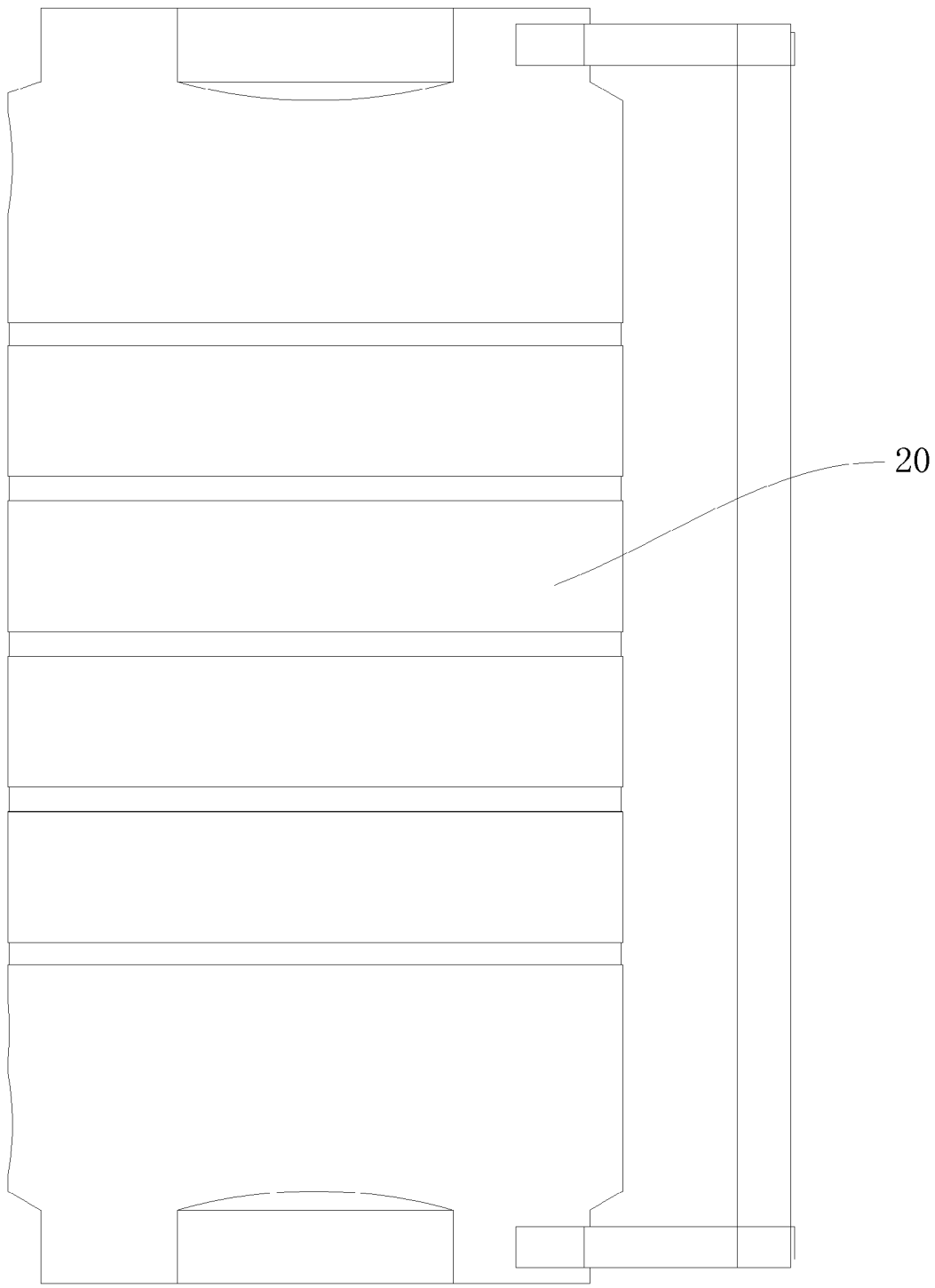
FIG. 3 illustrates a side view of an integrated composite filter cartridge according to an embodiment of the present disclosure.
Figure 4:
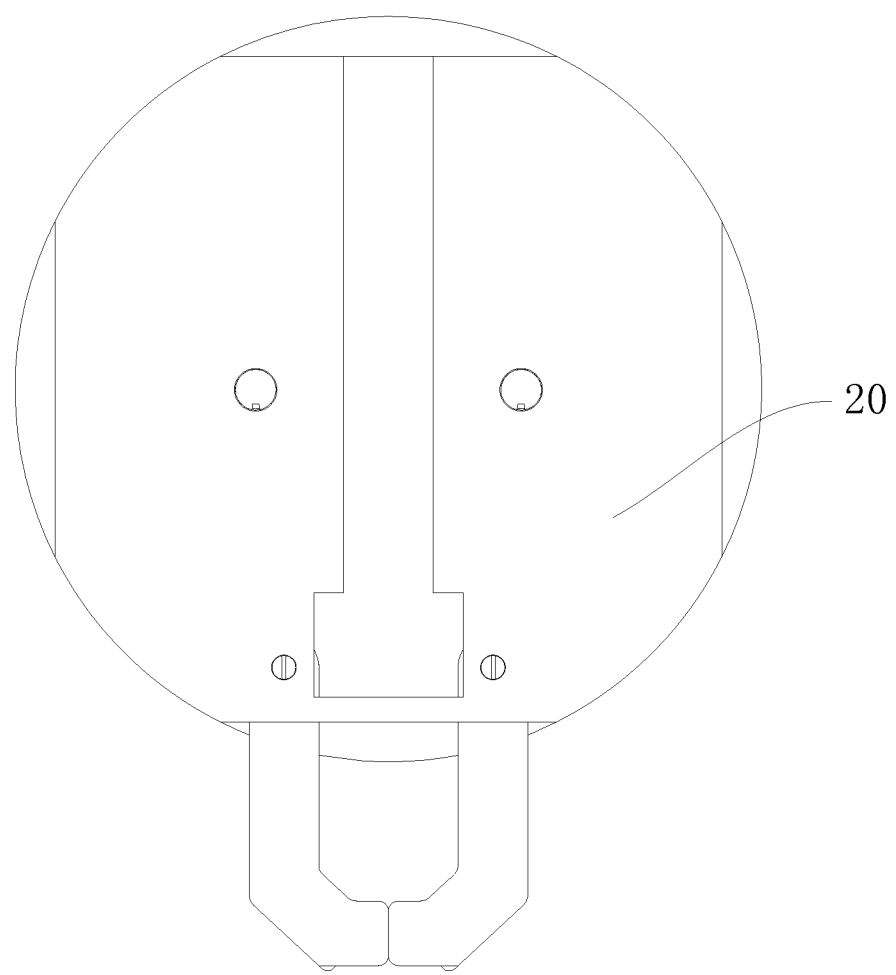
FIG. 4 illustrates a top view of an integrated composite filter cartridge according to an embodiment of the present disclosure.
Figure 5:
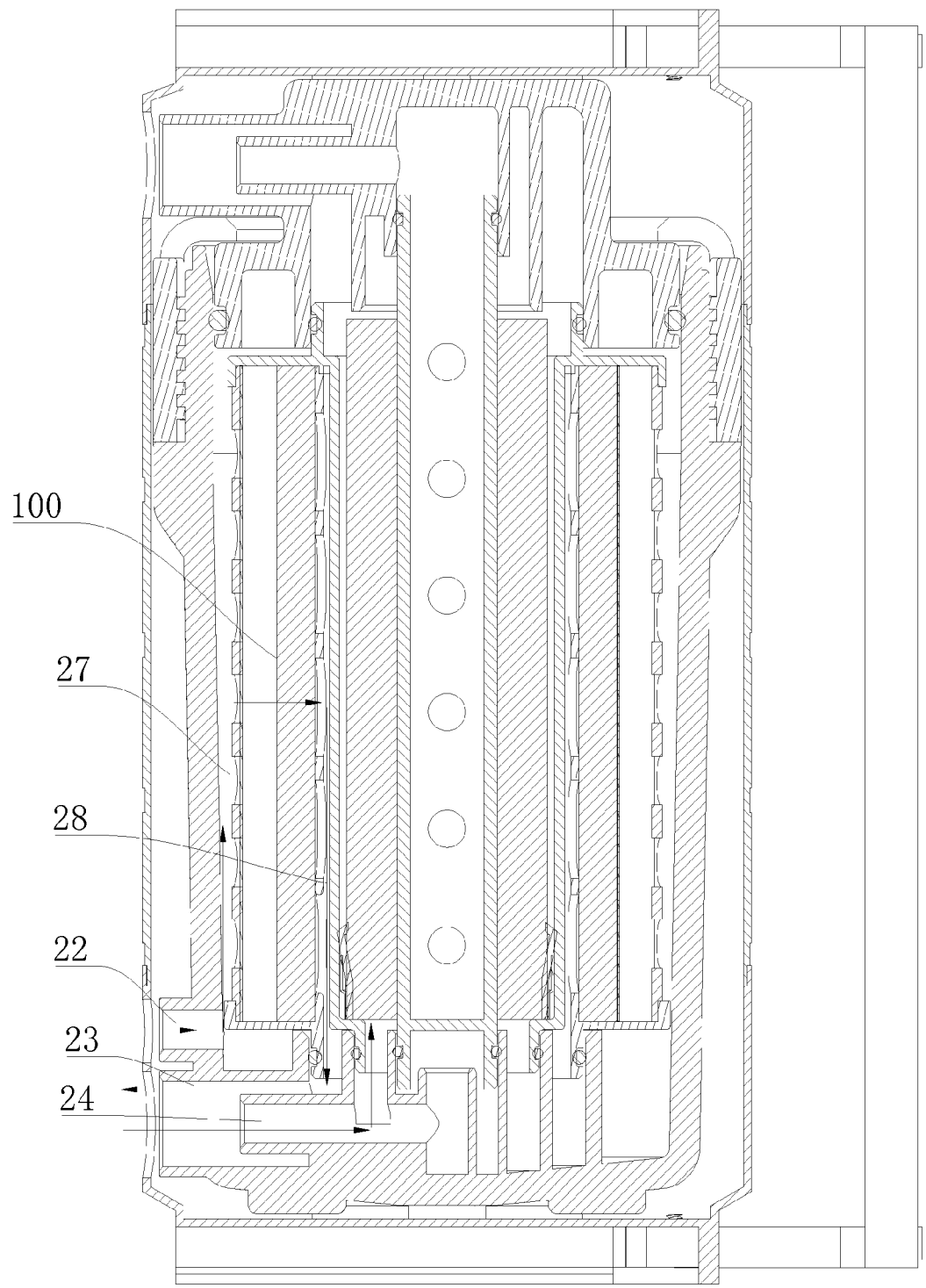
FIG. 5 illustrates a schematic view of an integrated composite filter cartridge according to an embodiment of the present disclosure, in which water is fed.
Figure 6:
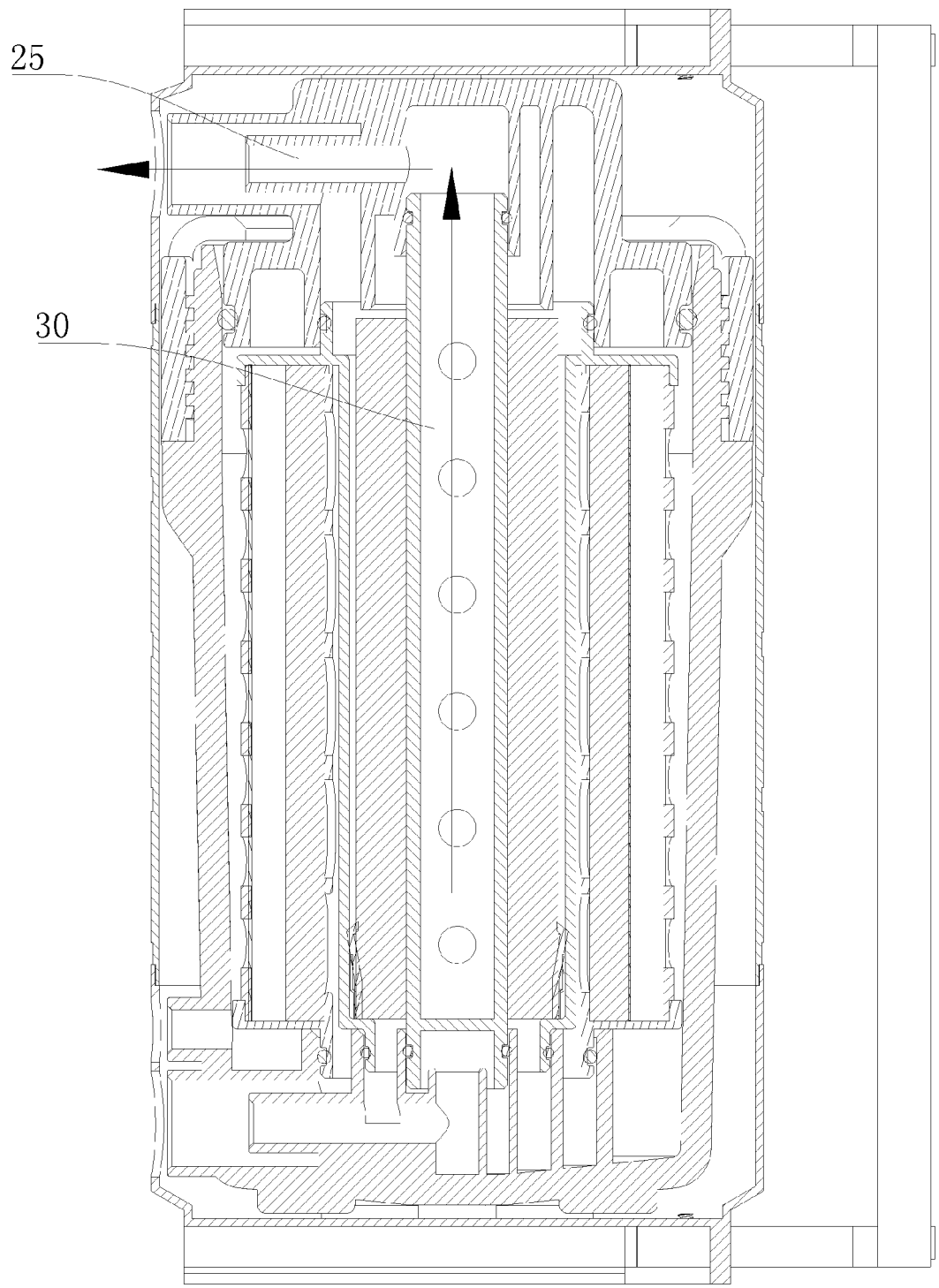
FIG. 6 illustrates a schematic view of an integrated composite filter cartridge according to an embodiment of the present disclosure, in which pure water is discharged.
Figure 7:
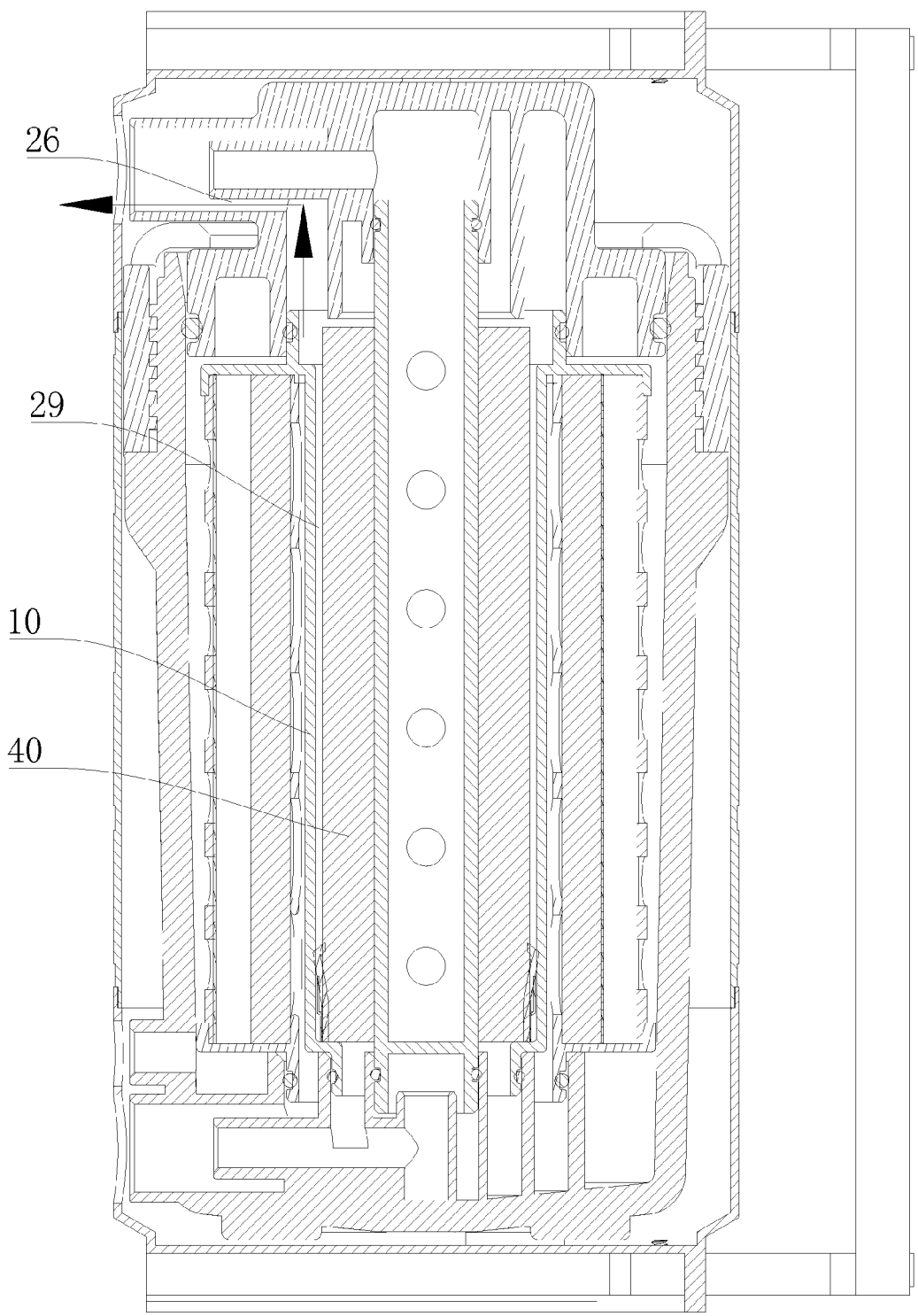
FIG. 7 illustrates a schematic view of an integrated composite filter cartridge according to an embodiment of the present disclosure, in which waste water is discharged.

REFERENCE NUMERALS pretreatment filter cartridge 100; integrated composite filter cartridge 200; water purification system 300; tap-water inlet 301; pure-purified-water outlet 302; concentrated-flushing-water outlet 303;

mounting pipe 10; first filter layer 11; second filter layer 12; third filter layer 13; upper-end cap 14; lower-end cap 15; support pipe 16; through hole 161; inner pipe 17; water-passing hole 171;

housing 20; chamber 21; raw-water inlet 22; pretreated-water outlet 23; pretreated-water inlet 24; pure-water outlet 25; waste-water outlet 26; water input passage 27; pretreated-water output passage 28; waste-water passage 29;

central pipe 30; water inlet 31; filter membrane 40; membrane pump 50; flexible water bag 60; water suction pump 70; waste-water-ratio solenoid valve 80; first control valve 91; second control valve 92.

DETAILED DESCRIPTION

Embodiments of the present disclosure will be described in detail and examples of the embodiments will be illustrated in the drawings, where same or similar reference numerals are used to indicate same or similar members or members with same or similar functions. The embodiments described herein with reference to drawings are explanatory, illustrative, and used to generally understand the present disclosure. The embodiments shall not be construed to limit the present disclosure.

In the specification, it is to be understood that terms such as "central," "axial," "radial," "length," "width," "thickness," "upper," "lower," "vertical," "horizontal," "top," "bottom," "inner," "outer," should be construed to refer to the orientation as then described or as shown in the drawings under discussion. These relative terms are for convenience of description and do not require that the present disclosure be constructed or operated in a particular orientation.

In addition, terms such as "first" and "second" are used herein for purposes of description and are not intended to indicate or imply relative importance or significance. Thus, features limited by "first" and "second" are intended to indicate or imply including one or more than one these features. In the description of the present disclosure, "a plurality of" means two or more than two, unless specified otherwise.

In the present disclosure, unless specified or limited otherwise, the terms "mounted," "connected," "coupled," "fixed" and the like are used broadly, and may be, for example, fixed connections, detachable connections, or integral connections; may also be mechanical or electrical connections; may also be direct connections or indirect connections via intervening structures; may also be inner communications of two elements. The above terms can be understood by those skilled in the art according to specific situations.

An integrated composite filter cartridge 200 according to embodiments of the present disclosure will be specifically described with reference to the drawings.

As illustrated in FIGS. 1 to 7, the integrated composite filter cartridge 200 according to embodiments of the present disclosure includes a housing 20, a pretreatment filter cartridge 100, a central pipe 30, a filter membrane 40 and a control member.

Specifically, the housing 20 defines a chamber 21 therein, and has a raw-water inlet 22, a pretreated-water outlet 23, a pretreated-water inlet 24, a pure-water outlet 25 and a waste-water outlet 26 that are in communication with the chamber 21. The pretreatment filter cartridge 100 is mounted in the chamber 21 and extends in an axial direction of the chamber 21. The pretreatment filter cartridge 100 includes a mounting pipe 10 and a filter layer. The mounting pipe 10 is configured to have a hollow cylinder shape extending in an up-and-down direction, and the filter layer is fitted over the mounting pipe 10. A water input passage 27 in communication with the raw-water inlet 22 is defined between the filter layer and the housing 20, and a pretreated-water output passage 28 in communication with the pretreated-water outlet 23 is defined between the filter layer and the mounting pipe 10.

The central pipe 30 is mounted in the mounting pipe 10 and extends in an axial direction of the mounting pipe 10. The central pipe 30 is spaced apart from the mounting pipe 10 to form a filter chamber in communication with the pretreated-water inlet 24. An end of the central pipe 30 is in communication with the pure-water outlet 25, and a water input hole 31 is formed in a side wall of the central pipe 30.

The filter membrane 40 is disposed in the filter chamber and winded around an outer circumferential wall of the central pipe 30. A waste-water passage 29 is defined between an outer circumferential wall of the filter membrane 40 and an inner circumferential wall of the mounting pipe 10, and the waste-water passage 29 is in communication with the waste-water outlet 26. The control member is connected to the pretreated-water outlet 23 and the pretreated-water inlet 24. The control member is configured to communicate the raw-water inlet 22 with the pretreated-water outlet 23 and to close the pretreated-water inlet 24 when the integrated composite filter cartridge 200 is used for the first time.

In other words, the pretreatment filter cartridge 100 according to embodiments of the preset disclosure is designed integrally, various filter layers have a consistent service life, and the whole pretreatment filter cartridge 100 can be replaced at one time after expiration. The integrated composite filter cartridge 200 according to embodiments of the present disclosure employs the pretreatment filter cartridge 100. The pretreatment filter cartridge 100 can pretreat a raw water, and a pretreated water after pretreatment can be further filtered by the filter membrane 40, so that a pretreatment and a post-treatment are combined to ensure a water purification effect.

The integrated composite filter cartridge 200 further includes the control member. The control member is connected to the pretreated-water outlet 23 and the pretreated-water inlet 24, and is configured to switch on or off communication between the pretreated-water outlet 23 and the pretreated-water inlet 24. The control member can recognize whether the integrated composite filter cartridge 200 is mounted and used for the first time. When the control member recognizes that the integrated composite filter cartridge 200 is mounted and used for the first time, the integrated composite filter cartridge 200 is controlled to enter an automatic water drainage mode. In this case, the control member switches off the communication between the pretreated-water outlet 23 and the pretreated-water inlet 24, the pretreated water after pretreatment will not enter the integrated composite filter cartridge 200 again through the pretreated-water inlet 24 to be further filtered, but will be discharged out directly. Thus, when mounted and used for the first time, the integrated composite filter cartridge 200 will perform an automatic cleaning and discharge carbon powders coming out of the pretreatment filter cartridge 100.

When the control member recognizes that the integrated composite filter cartridge 200 is not used for the first time, the control member controls the integrated composite filter cartridge 200 to enter a normal water production state. In this case, the pretreated-water outlet 23 is communicated with the pretreated-water inlet 24, the pretreated water after pretreatment flows out of the pretreated-water outlet 23, then flows into the integrated composite filter cartridge 200 again through the pretreated-water inlet 24 after being pressurized, and is further filtered by the filter membrane 40, thus achieving the water purification effect.

In the integrated composite filter cartridge 200 according to embodiments of the present disclosure, the pretreatment filter cartridge 100 is designed integrally, various filter layers have the consistent service life, and the whole pretreatment filter cartridge 100 can be replaced at one time after expiration, thereby solving a problem that the consumer needs to replace different filter cartridges frequently, and hence reducing costs. The integrated composite filter cartridge 200 is provided with the control member, and the control member can automatically recognize that the integrated composite filter cartridge 200 is mounted and used for the first time, so as to perform the automatic flushing without being flushed manually, so that the integrated composite filter cartridge 200 can be used more conveniently.

Since the integrated composite filter cartridge 200 according to embodiments of the present disclosure has a function of automatic flushing when being mounted for the first time, the pretreatment filter cartridge 100 can still be applied to the integrated composite filter cartridge 200 of the present disclosure, even if the filter layer of the pretreatment filter cartridge 100 includes a carbon rod structure. Alternatively, according to an embodiment of the present disclosure, two filter layers are provided and winded around the mounting pipe respectively, the filter layer located at an outer circle is configured as a PP cotton, and the filter layer located at an inner circle is configured as a carbon rod.

As illustrated in FIGS. 1 to 7, in some other specific embodiments of the present disclosure, the filter cartridge includes a first filter layer 11, a second filter layer 12 and a third filter layer 13.

Specifically, the mounting pipe 10 is configured to have a hollow cylinder shape extending in the up-and-down direction. The first filter layer 11, the second filter layer 12 and the third filter layer 13 are fitted over the mounting pipe 10 successively from outside to inside. The first filter layer 11 is configured as a PP cotton, the second filter layer 12 is configured as an activated carbon fiber winding layer, and the third filter layer 13 is configured as one of the PP cotton, a microfiltration membrane or an ultrafiltration membrane.

In other words, the pretreatment filter cartridge 100 according to embodiments of the present disclosure mainly includes the mounting pipe 10 and the three filter layers winded around the mounting pipe 10 successively in a nested arrangement. The three filter layers are the first filter layer 11, the second filter layer 12 and the third filter layer 13 arranged successively from outside to inside in a radial direction of the mounting pipe 10. The first filter layer 11 is configured as the PP cotton, the second filter layer 12 is configured as the activated carbon fiber winding layer, and the third filter layer 13 is configured as one of the PP cotton, the microfiltration membrane or the ultrafiltration membrane.

That is to say, the pretreatment filter cartridge 100 does not include an adsorption structure that will produce fine carbon powders. No fine carbon powder will come out of the pretreatment filter cartridge 100 after the pretreatment filter cartridge 100 is mounted initially, so that a flushing time can be reduced. The plurality of filter layers are integrally disposed to the mounting pipe 10 respectively, and have a substantially consistent service life. Thus, the whole pretreatment filter cartridge 100 can be replaced at one time after expiration.

Thus, in the pretreatment filter cartridge 100 according to embodiments of the present disclosure, the pretreatment filter cartridge 100 is configured as a structure including the first filter layer, the second filter layer and the third filter layer that are constructed without the fine carbon powder, so that the pretreatment filter cartridge 100 has a simple structure. Since there is no fine carbon powder flowing out during the initial mounting, the flushing time can be reduced. The pretreatment filter cartridge 100 is designed integrally, various filter layers have the consistent service life, and the whole pretreatment filter cartridge 100 can be replaced at one time after expiration, thereby solving the problem of the consumer needs to replace different filter cartridges frequently, and hence reducing the costs.

According to an embodiment of the present disclosure, the pretreatment filter cartridge 100 further includes an upper-end cap 14, a lower-end cap 15 and a support pipe 16. Specifically, the upper-end cap 14 is disposed to a periphery of an upper end of the mounting pipe 10, the lower-end cap 15 is disposed to a periphery of a lower end of the mounting pipe 10, and the first filter layer 11, the second filter layer 12 and the third filter layer 13 are disposed between the upper-end cap 14 and the lower-end cap 15. The support pipe 16 is fitted over the mounting pipe 10 and is located between the upper-end cap 14 and the lower-end cap 15. The first filter layer 11, the second filter layer 12 and the third filter layer 13 are disposed between an outer circumferential surface of the mounting pipe 10 and an inner circumferential surface of the support pipe 16. The support pipe 16 is provided with a plurality of through holes 161 communicating inside with outside.

As illustrated in FIG. 1, the pretreatment filter cartridge 100 includes the mounting pipe 10, the upper end of the mounting pipe 10 is provided with the upper-end cap 14 extending in the radial direction of the mounting pipe 10, and the lower end of the mounting pipe 10 is provided with the lower-end cap 15 extending in the radial direction of the mounting pipe 10. The first filter layer 11, the second filter layer 12 and the third filter layer 13 are disposed between the upper-end cap 14 and the lower-end cap 15. The support pipe 16 is disposed outside of the third filter layer 13, an upper end of the support pipe 16 abuts against the upper-end cap 14, and a lower end of the support pipe 16 abuts against the lower-end cap 15. Thus, based on a simple structure, the pretreatment filter cartridge 100 can effectively ensure a stability of the whole structure.

Further, according to an embodiment of the present disclosure, the pretreatment filter cartridge 100 further includes an inner pipe 17 fitted over the mounting pipe 10, and an inner circumferential surface of the inner pipe 17 is spaced apart from the outer circumferential surface of the mounting pipe 10. An upper end of the inner pipe 17 abuts against the upper-end cap 14, and a lower end of the inner pipe 17 abuts against the lower-end cap 15. The third filter layer 13 is fitted over the inner pipe 17, and the inner pipe 17 is provided with a plurality of water-passing holes 17 communicating inside with outside.

That is to say, the first filter layer 11, the second filter layer 12 and the third filter layer 13 are not directly winded around the mounting pipe 10 in the nested arrangement, but are winded around the inner pipe 17 in the nested arrangement. The inner pipe 17 is fitted over the mounting pipe 10 and is spaced apart from the mounting pipe 10 to form the pretreated-water output passage. The inner pipe 17 is provided with the plurality of water-passing holes 171 in communication with the pretreated-water passage.

Specifically, when the pretreatment filter cartridge 100 according to embodiments of the present disclosure is in use, the raw water enters the pretreatment filter cartridge 100 through the through holes 161 of the support pipe 16, then passes through the first filter layer 11, the second filter layer 12 and the third filter layer 13 successively, and further enters the pretreated-water output passage through the water-passing holes 171 of the inner pipe 17. The pretreated water after pretreatment of the pretreatment filter cartridge 100 is discharged out of the pretreated-water output passage, and can be further filtered.

In some specific embodiments of the present disclosure, upper-end surfaces of the first filter layer 11, the second filter layer 12 and the third filter layer 13 each abut against the upper-end cap 14, lower-end surfaces of the first filter layer 11, the second filter layer 12 and the third filter layer 13 each abut against the lower-end cap 15, the mounting pipe 10 and the upper-end cap 14 are integrally formed, and the inner pipe 17 and the lower-end cap 15 are integrally formed. Thus, the pretreatment filter cartridge 100 has a compact structure, and each component can be molded easily. Moreover, the pretreatment filter cartridge 100 has a high stability, simplifies an assembling process thereof, and reduces the costs.

According to embodiments of the present disclosure, the first filter layer 11 (i.e. the PP cotton layer) may be configured as a PP non-woven fabric winding layer, and may also be configured as a foldable PP non-woven fabric or a wire-winding PP cotton. The second filter layer 12 may be configured as an activated carbon fiber winding layer, and may also be configured as materials having an adsorption function, such as an activated carbon rod, a granular activated carbon or an acidic activated carbon. The third filter layer 13 may be configured as a high-precision CRN microfiltration membrane or an ultrafiltration membrane.

Alternatively, according to an embodiment of the present disclosure, the first filter layer 11 is configured as the PP non-woven fabric winding layer, and the third filter layer 13 is configured as the CRN microfiltration membrane. In some specific embodiments of the present disclosure, the first filter layer 11 is a 5-micron PP cotton, and the third filter layer 13 is a 1-micron PP cotton. In some other specific embodiments of the present disclosure, the first filter layer 11 may also be the wire-winding PP cotton, and the third filter layer 13 may be the ultrafiltration membrane.

Preferably, according to an embodiment of the present disclosure, an inner diameter of the third filter layer 13 is 60-70 mm, a difference between the inner diameter of the third filter layer 13 and an outer diameter of the first filter layer 11 is 15-20 mm, and heights of the first filter layer 11, the second filter layer 12 and the third filter layer 13 in the up-and-down direction each are 100-110 mm. Further, the inner diameter of the third filter layer 13 is 65 mm, the difference between the inner diameter of the third filter layer 13 and the outer diameter of the first filter layer 11 is 18 mm, and the heights of the first filter layer 11, the second filter layer 12 and the third filter layer 13 in the up-and-down direction each are 106 mm.

Thus, the service lives of the first filter layer 11, the second filter layer 12 and the third filter layer 13 of the pretreatment filter cartridge 100 can be ensured as consistent as possible. The whole pretreatment filter cartridge 100 can be replaced at one time after expiration. Thus, a trouble that the consumer needs to replace the different filter cartridges frequently can be solved, and also each filter layer can be ensured to be fully used so as to prevent a waste of a certain filter layer. Specifically, according to embodiments of the present disclosure, the water input passage 27 in communication with the raw-water inlet 22 is defined between the first filter layer 11 and the housing 20, and the pretreated-water output passage 28 in communication with the pretreated-water outlet 23 is defined between the third filter layer 13 and the mounting pipe 10.

That is to say, the integrated composite filter cartridge 200 according to embodiments of the present disclosure mainly includes the housing 20, the pretreatment filter cartridge 100, the central pipe 30 and the filter membrane 40. The pretreatment filter cartridge 100 is mounted in the housing 20, and the water input passage 27 is defined between the support pipe 16 of the pretreatment filter cartridge 100 and the housing 20. The water input passage 27 is in communication with the raw-water inlet 22, and the raw water entering the housing 20 through the raw-water inlet 22 enters the water input passage 27 first.

The support pipe 16 of the pretreatment filter cartridge 100 is provided with the plurality of through holes 161, and the raw water in the water input passage 27 flows into the first filter layer 11, the second filter layer 12 and the third filter layer 13 successively through the plurality of through holes 161. The pretreated water after being pretreated by the first filter layer 11, the second filter layer 12 and the third filter layer 13 enters the pretreated-water output passage 28 between the inner pipe 17 and the mounting pipe 10 through the water-passing holes 171 of the inner pipe 17. The pretreated-water output passage 28 is in communication with the pretreated-water outlet 23, so that the pretreated water can flow out of the pretreated-water outlet 23 (as illustrated by arrows in FIG. 5).

The pretreated water flowing out of the pretreated-water outlet 23 can be pressurized by a boosting device. The pretreated water after being pressurized enters the housing 20 again through the pretreated-water inlet 24. The pretreated water enters the filter chamber between the central pipe 30 and the mounting pipe 10 (as illustrated by arrows in FIG. 5). After being filtered by the filter membrane 40, the pretreated water is divided into a waste water and a purified water. The purified water enters the central pipe 30 through the water inlet 31 of the central pipe 30, and then flows out of the pure-water outlet 25 (as illustrated by arrows in FIG. 6). The waste water flows out of the waste-water outlet 26 through the waste-water passage 29 between the filter membrane 40 and the mounting pipe 10, so as to achieve a discharge of the waste water (as illustrated by arrows in FIG. 7).

The control member may be provided with an anti-counterfeiting chip, the anti-counterfeiting chip can automatically recognize whether the integrated composite filter cartridge 200 is mounted for the first time. When the anti-counterfeiting chip detects that the integrated composite filter cartridge 200 is mounted and used for the first time, the integrated composite filter cartridge 200 is controlled to enter the automatic water drainage mode. In this case, the pretreated-water outlet 23 and the pretreated-water inlet 24 are not communicated with each other. The pretreated water flowing out of the pretreated-water outlet 23 cannot enter the integrated composite filter cartridge 200 to be filtered again, but is discharged out directly, so as to flush the integrated composite filter cartridge 200 and to discharge out the carbon powder particles or other impurities in the integrated composite filter cartridge 200.

When the integrated composite filter cartridge 200 is not mounted and used for the first time, i.e. the integrated composite filter cartridge 200 has been flushed, the control member controls the integrated composite filter cartridge 200 to enter the automatic water production mode. The pretreated-water outlet 23 is communicated with the pretreated-water inlet 24. The pretreated water after pretreatment flows out of the pretreated-water outlet 23, then flows into the integrated composite filter cartridge 200 again through the pretreated-water inlet 24 under a function of the boosting device, and is further filtered to achieve the water purification effect.

Thus, the integrated composite filter cartridge 200 according to embodiments of the present disclosure has a reasonable structure. By providing the control member, the integrated composite filter cartridge 200 can automatically enter a flushing mode when being used for the first time, so as to be cleaned automatically. Furthermore, the integrated composite filter cartridge 200 has a quick cleaning speed, and the system can switch to the normal water production mode after the flushing is completed.

According to an embodiment of the present disclosure, the raw-water inlet 22 is configured as a single hole, and the pretreated-water outlet 23 and the pretreated-water inlet 24 are configured to be in a nested arrangement, i.e. the pretreated-water inlet 24 is nested within the pretreated-water outlet 23. Further, the pure-water outlet 25 and the waste-water outlet 26 are configured to be in a nested arrangement, i.e. the pure-water outlet 25 is nested within the waste-water outlet 26.

That is to say, in the housing 20 of the integrated composite filter cartridge 200 according to embodiments of the present disclosure, except the raw-water inlet 22 being configured as the single hole, the pretreated-water outlet 23 and the pretreated-water inlet 24 are in the nested arrangement, and also, the pure-water outlet 25 and the waste-water outlet 26 are in the nested arrangement. That is, the pretreated-water inlet 24 is nested within the pretreated-water outlet 23, and the pure-water outlet 25 is nested within the waste-water outlet 26.

Thus, various pipe ports of the integrated composite filter cartridge 200 can be fitted with one another more conveniently, and the integrated composite filter cartridge 200 has fewer connectors to outside, thereby reducing water leakage points. Furthermore, various water passages in the integrated composite filter cartridge 200 are distributed more reasonably, so that an entire structure of the integrated composite filter cartridge 200 can be more compact, thus facilitating a miniaturization design of the integrated composite filter cartridge 200.

In some specific embodiments of the present disclosure, the pretreated-water outlet 23 is disposed below the raw-water inlet 22 and is located at a lower part of the housing 20, the pure-water outlet 25 is disposed at an upper part of the housing, and an upper end of the central pipe is opened and in communication with the pure-water outlet 25.

That is to say, the pretreated-water outlet 23 and the pretreated-water inlet 24 that are in the nested arrangement are disposed at a position adjacent to the lower part of the housing 20, the pure-water outlet 25 and the waste-water outlet 26 that are in the nested arrangement are disposed at a position adjacent to the upper part of the housing 20, and the raw-water inlet 22 is disposed above the pretreated-water outlet 23 and the pretreated-water inlet 24.

When the integrated composite filter cartridge 200 is in use, the raw water enters the housing 20 through the raw-water inlet 22 at the lower part of the housing 20, and flows out of an outer-hole water passage of nested multiple holes located at a lower portion of the integrated composite filter cartridge 200, i.e. out of the pretreated-water outlet 23, after being filtered by the first filter layer 11, the second filter layer 12 and the third filter layer 13. The pretreated water flowing out of the pretreated-water outlet 23 enters the housing 20 again through the pretreated-water inlet 24 after being pressurized, then flows upwards from a bottom of the integrated composite filter cartridge 200 into the filter chamber, and is divided into the purified water and the waste water after being filtered by the filter membrane 40. The purified water flows upwards in a path to be discharged of the pure-water outlet 25, and the waste water flows upwards in another path to be discharged out of the waste-water outlet 26.

Thus, the water passage arrangement of the integrated composite filter cartridge 200 is more reasonable, thereby facilitating flowing and filtration of the raw water, and hence improving a water purification efficiency of the integrated composite filter cartridge 200.

In some specific embodiments of the present disclosure, the filter membrane 40 may be configured as a reverse osmosis membrane, an ultrafiltration membrane or a nanofiltration membrane. Thus, on the basis of ensuring a filtering effect, the filter membrane 40 facilitates the assembling of the integrated composite filter cartridge 200 and reasonably controls the cost of the integrated composite filter cartridge 200.

Figure 8:
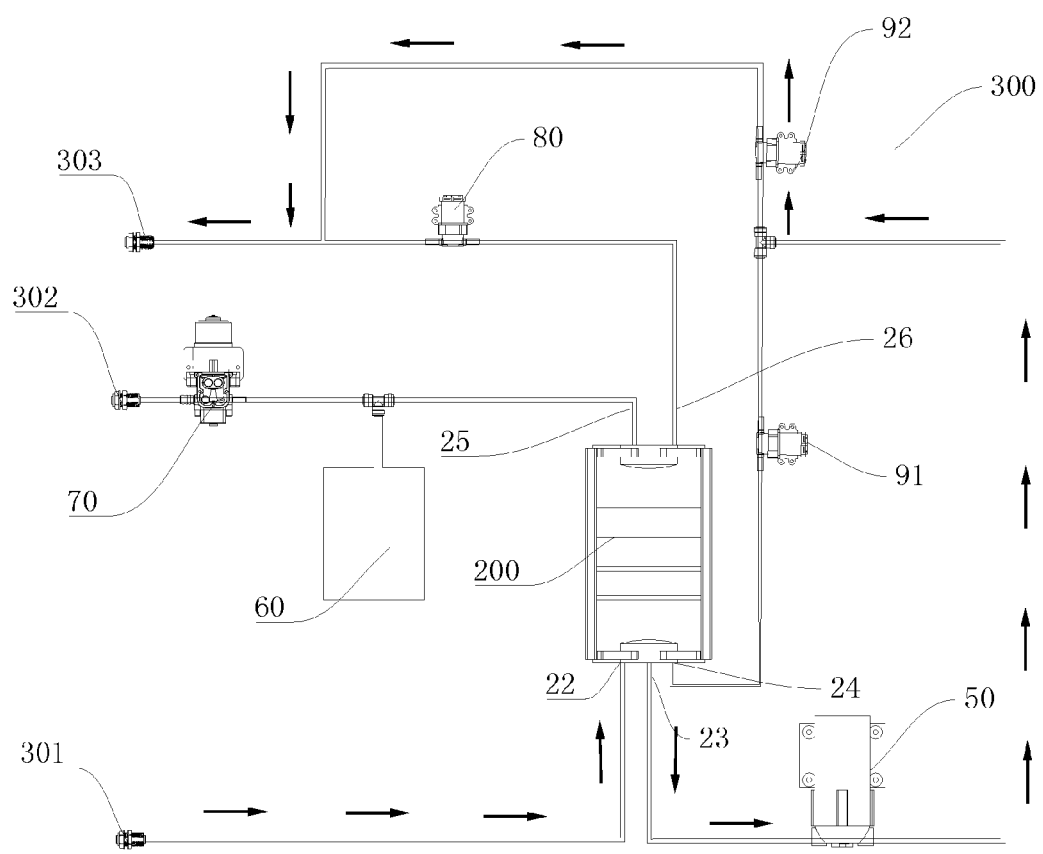
FIG. 8 illustrates a schematic view of a water purification system according to an embodiment of the present disclosure, in which a water path of automatic flushing is shown.
Figure 9:
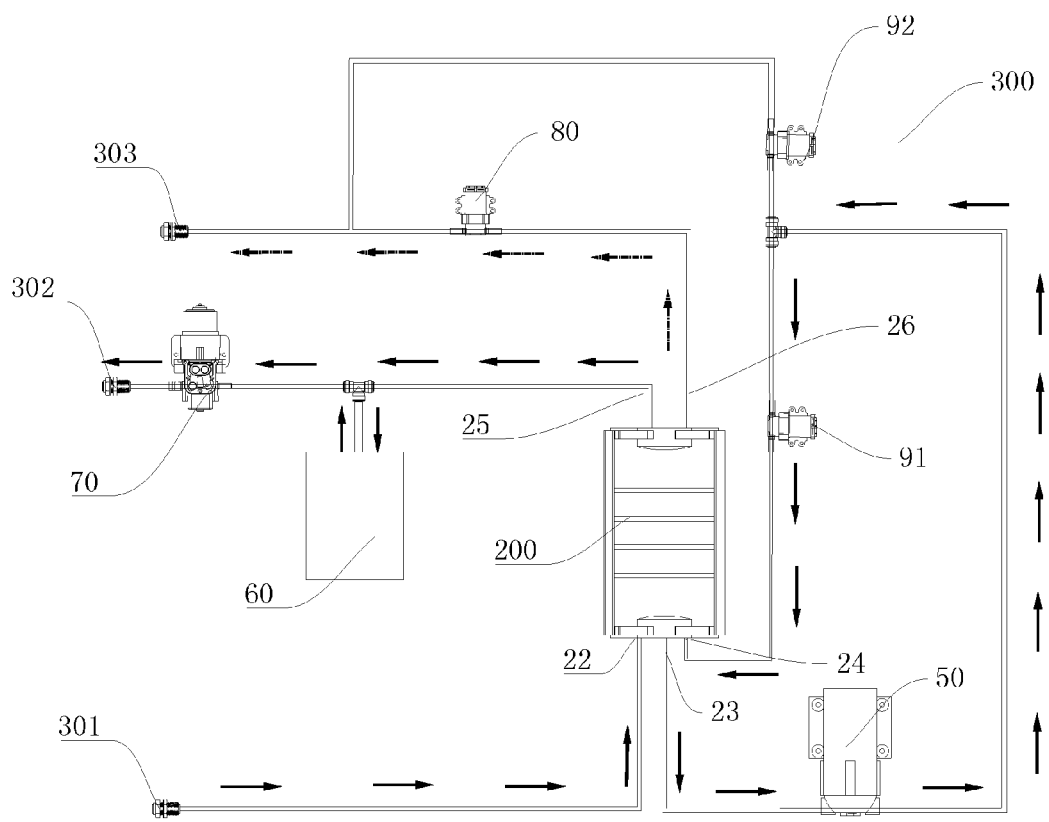
FIG. 9 illustrates a schematic view of a water purification system according to an embodiment of the present disclosure, in which a water path of water production is shown.

A water purification system 300 according to embodiments of the present disclosure will be described specifically below in combination with FIGS. 8 to 9.

The water purification system 300 according to embodiments of the present disclosure includes an integrated composite filter cartridge 200, a tap-water inlet 301, a pure-purified-water outlet 302, a concentrated-flushing-water outlet 303 and a membrane pump 50.

Specifically, the tap-water inlet 301 is in communication with the raw-water inlet 22, and the membrane pump 50 is disposed between the pretreated-water outlet 23 and the pretreated-water inlet 24. The pure-purified-water outlet 302 is in communication with the pure-water outlet 25, and the concentrated-flushing-water outlet 303 is in communication with the waste-water outlet 26. The membrane pump 50 is disposed between the pretreated-water outlet 23 and the pretreated-water inlet 24 to pressurize the pretreated water flowing out of the pretreated-water outlet 23, and thus the pretreated water enters the integrated composite filter cartridge 200 again through the pretreated-water inlet 24 to be further filtered, so as to achieve the water purification effect.

Since the integrated composite filter cartridge 200 according to embodiments of the present disclosure has the above-described technical effects, the water purification system 300 according to embodiments of the present disclosure also has the corresponding technical effects. That is, the water purification system 300 has a compact entire structure, and few water leakage points. Furthermore, the water purification system 300 can perform an automatic flushing during the initial mounting. Various filter layers of the integrated composite filter cartridge 200 have a consistent service life, and can be replaced as a whole, so that it is convenient for the consumer to use the integrated composite filter cartridge 200.

According to an embodiment of the present disclosure, the control member includes a first control valve 91 and a second control valve 92. The first control valve 91 is disposed between the pretreated-water outlet 23 and the pretreated-water inlet 24 and configured to switch on or off communication between the pretreated-water outlet 23 and the pretreated-water inlet 24. The second control valve 92 is disposed between the pretreated-water outlet 23 and the concentrated-flushing-water outlet 303 and configured to switch on or off communication between the pretreated-water outlet 23 and concentrated-flushing-water outlet 303.

That is to say, the control member further includes two control valves. One control valve is disposed between the pretreated-water outlet 23 and the pretreated-water inlet 24 and configured to switch on or off the communication between the pretreated-water outlet 23 and the pretreated-water inlet 24, while the other control valve is disposed between the pretreated-water outlet 23 and the concentrated-flushing-water outlet 303 and configured to switch on or off the communication between the pretreated-water outlet 23 and the concentrated-flushing-water outlet 303.

When the anti-counterfeiting chip of the controller recognizes that the integrated composite filter cartridge 200 is mounted and used initially, the integrated composite filter cartridge 200 is controlled to enter an automatic flushing mode. In this case, the first control valve 91 between the pretreated-water outlet 23 and the pretreated-water inlet 24 is closed, and the second control valve 92 between the pretreated-water outlet 23 and the concentrated-flushing-water outlet 303 is open, so that the pretreated water flowing out of the pretreated-water outlet 23 flows out of the concentrated-flushing-water outlet 303 directly, thus achieving the automatic flushing of the integrated composite filter cartridge 200.

After the integrated composite filter cartridge 200 is flushed for 1-2 minutes or the controller recognizes that the integrated composite filter cartridge 200 is not mounted and used initially, the integrated composite filter cartridge 200 is controlled to enter an automatic water production mode. In this case, the first control valve 91 between the pretreated-water outlet 23 and the pretreated-water inlet 24 is open, and the second control valve 92 between the pretreated-water outlet 23 and the concentrated-flushing-water outlet 303 is closed, so that the pretreated water flowing out of the pretreated-water outlet 23 enters the integrated composite filter cartridge 20 through the pretreated-water inlet 24 after being pressurized by the membrane pump 50, so as to be filtered further and hence to be divided into the pure water and the waste water which are discharged out respectively.

Thus, the controller has a simple structure, and is easy to mount. Furthermore, the controller has a simple and feasible control process, and thus is convenient for a user to use.

Further, in some specific embodiments of the present disclosure, a flexible water bag 60 is provided between the pure-purified-water outlet 302 and the pure-water outlet 25, and a water suction pump 70 may also be provided between the flexible water bag 60 and the pure-purified-water outlet 302. A waste-water-ratio solenoid valve 80 may also be provided between the concentrated-flushing-water outlet 303 and the waste-water outlet 26.

The pure water flowing out of the pure-water outlet 25 may enter the flexible water bag 60 first. When the flexible water bag 60 is full of the pure water, a microswitch or a reed switch of the flexible water bag 60 sends a signal to a control panel of the water purification system 300, and the control panel sends a signal to turn off the membrane pump 50 and close the raw-water inlet 22, so that the water purification system 300 stops producing water.

Other configurations and operations of the water purification system 300 according to embodiments of the present disclosure are well known by those skilled in the art, and thus will not be described in detail herein.

Reference throughout this specification to "an embodiment," "some embodiments," "an example," "a specific example," or "some examples," means that a particular feature, structure, material, or characteristic described in connection with the embodiment or example is included in at least one embodiment or example of the present disclosure. Thus, the appearances of the phrases in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from principles and scope of the present disclosure.

What is claimed is:

1. An integrated composite filter cartridge, comprising:
   a housing defining a chamber therein, and having a raw-water inlet, a pretreated-water outlet, a pretreated-water inlet, a pure-water outlet and a waste-water outlet each in communication with the chamber;
   a pretreatment filter cartridge mounted in the chamber and extending in an axial direction of the chamber, and the pretreatment filter cartridge comprising:
   a mounting pipe configured to have a hollow cylinder shape extending in an up-and-down direction;
   a filter layer fitted over the mounting pipe, a water input passage in communication with the raw-water inlet being defined between the filter layer and the housing, and a pretreated-water output passage in communication with the pretreated-water outlet being defined between the filter layer and the mounting pipe;
   a central pipe mounted in the mounting pipe and extending in an axial direction of the mounting pipe, the central pipe being spaced apart from the mounting pipe to form a filter chamber in communication with the pretreated-water inlet, an end of the central pipe being in communication with the pure-water outlet, and the central pipe having a water input hole in a side wall thereof;
   a filter membrane disposed in the filter chamber and winded around an outer circumferential wall of the central pipe, a waste-water passage being defined between an outer circumferential wall of the filter membrane and an inner circumferential wall of the mounting pipe, and the waste-water passage being in communication with the waste-water outlet;
   a control member connected to the pretreated-water outlet and pretreated-water inlet, and configured to communicate the raw-water inlet with the pretreated-water outlet and to close the pretreated-water inlet when the integrated composite filter cartridge is used for the first time, wherein the control member has one or more control valves.

2. The integrated composite filter cartridge according to claim 1, wherein two filter layers are provided and winded around the mounting pipe respectively, the filter layer located at an outer circle is configured as a polypropylene (PP) cotton, and the filter layer located at an inner circle is configured as a carbon rod.

3. The integrated composite filter cartridge according to claim 1, wherein the filter layer comprises a first filter layer, a second filter layer and a third filter layer fitted over the mounting pipe successively from outside to inside, the first filter layer is configured as a PP cotton, the second filter layer is configured as an activated carbon fiber winding layer, the third filter layer is configured as one of the PP cotton, a microfiltration membrane or an ultrafiltration membrane, the water input passage in communication with the raw-water inlet is defined between the first filter layer and the housing, and the pretreated-water output passage in communication with the pretreated-water outlet is defined between the third filter layer and the mounting pipe.

4. The integrated composite filter cartridge according to claim 1, wherein the pretreatment filter cartridge further comprises:
   an upper-end cap disposed to a periphery of an upper end of the mounting pipe;
   a lower-end cap disposed to a periphery of a lower end of the mounting pipe, and the filter layer being disposed between the upper-end cap and the lower-end cap;
   a support pipe fitted over the mounting pipe and located between the upper-end cap and the lower-end cap, the filter layer being disposed between an outer circumferential surface of the mounting pipe and an inner circumferential surface of the support pipe, and the support pipe having a plurality of through holes communicating inside with outside.

5. The integrated composite filter cartridge according to claim 4, wherein the pretreatment filter cartridge further comprises an inner pipe fitted over the mounting pipe, an inner circumferential surface of the inner pipe is spaced apart from the outer circumferential surface of the mounting pipe, an upper end of the inner pipe abuts against the upper-end cap, a lower end of the inner pipe abuts against the lower-end cap, the filter layer is fitted over the inner pipe, and the inner pipe has a plurality of water-passing holes communicating inside with outside.

6. The integrated composite filter cartridge according to claim 1, wherein the raw-water inlet is configured as a single hole, the pretreated-water outlet and the pretreated-water inlet are configured to be in a nested arrangement, the pretreated-water inlet is nested within the pretreated-water outlet, the pure-water outlet and the waste-water outlet are configured to be in a nested arrangement, and the pure-water outlet is nested within the waste-water outlet.

7. The integrated composite filter cartridge according to claim 1, wherein the filter membrane is configured as a reverse osmosis membrane, an ultrafiltration membrane or a nanofiltration membrane.

8. The integrated composite filter cartridge according to claim 1, wherein the control member is further configured to recognize whether the integrated composite filter cartridge is used for the first time.

9. The integrated composite filter cartridge according to claim 1, wherein the control member is further configured to communicate the pretreated-water outlet with the pretreated-water inlet when the integrated composite filter cartridge is not used for the first time.

10. The integrated composite filter cartridge according to claim 1, wherein the control member comprises an anti-counterfeiting chip, the anti-counterfeiting chip configured to automatically recognize whether the integrated composite filter cartridge is used for the first time.

11. The integrated composite filter cartridge according to claim 10, wherein the control member further comprises:

a first control valve disposed between the pretreated-water outlet and the pretreated-water inlet and configured to switch on or off communication between the pretreated-water outlet and the pretreated-water inlet; and a second control valve disposed between the pretreated-water outlet and a concentrated-flushing-water outlet and configured to switch on or off communication between the pretreated-water outlet and the concentrated-flushing-water outlet said concentrated-flushing-water outlet being in communication with the waste-water outlet.

12. The integrated composite filter cartridge according to claim 11, wherein when the anti-counterfeiting chip recognizes that the integrated composite filter cartridge is used for the first time, the first control valve is deactuated and the second control valve is actuated.

13. The integrated composite filter cartridge according to claim 11, wherein when the anti-counterfeiting chip recognizes that the integrated composite filter cartridge is not used for the first time, the first control valve is actuated and the second control valve is deactuated.

* * * * *